CARD PROCESSING APPARATUS

Filed May 28, 1959 5 Sheets-Sheet 1

INVENTORS:
Alfred E. Gray
Herman J. Malin
Harold B. Thompson
By Smyth & Roston
Attorneys Jan. 22, 1963 A. E. GRAY ET AL 3,074,711

CARD PROCESSING APPARATUS

Filed May 28, 1959 5 Sheets-Sheet 2

INVENTORS:
Alfred E. Gray
Herman J. Malin
Harold B. Thompson

By Smyth & Roston
Attorneys

Jan. 22, 1963 A. E. GRAY ET AL 3,074,711

CARD PROCESSING APPARATUS

Filed May 28, 1959 5 Sheets-Sheet 3

INVENTORS:
Alfred E. Gray
Herman J. Malin
Harold B. Thompson

By Smyth & Roston

Attorneys

CARD PROCESSING APPARATUS

Filed May 28, 1959 5 Sheets-Sheet 4

INVENTORS:
Alfred E. Gray
Herman J. Malin
Harold B. Thompson
By Smyth & Roston
Attorneys Jan. 22, 1963 A. E. GRAY ET AL 3,074,711

CARD PROCESSING APPARATUS

Filed May 28, 1959 5 Sheets-Sheet 5

INVENTORS:
Alfred E. Gray
Herman J. Malin
Harold B. Thompson

By

Attorneys,

United States Patent Office 3,074,711
Patented Jan. 22, 1963

3,074,711
CARD PROCESSING APPARATUS
Alfred E. Gray and Herman J. Malin, Culver City, and Harold B. Thompson, Playa Del Rey, Calif., assignors to Magnavox Company, Los Angeles, Calif., a corporation of Delaware
Filed May 28, 1959, Ser. No. 816,591
14 Claims. (Cl. 271—5)

Figure 1:
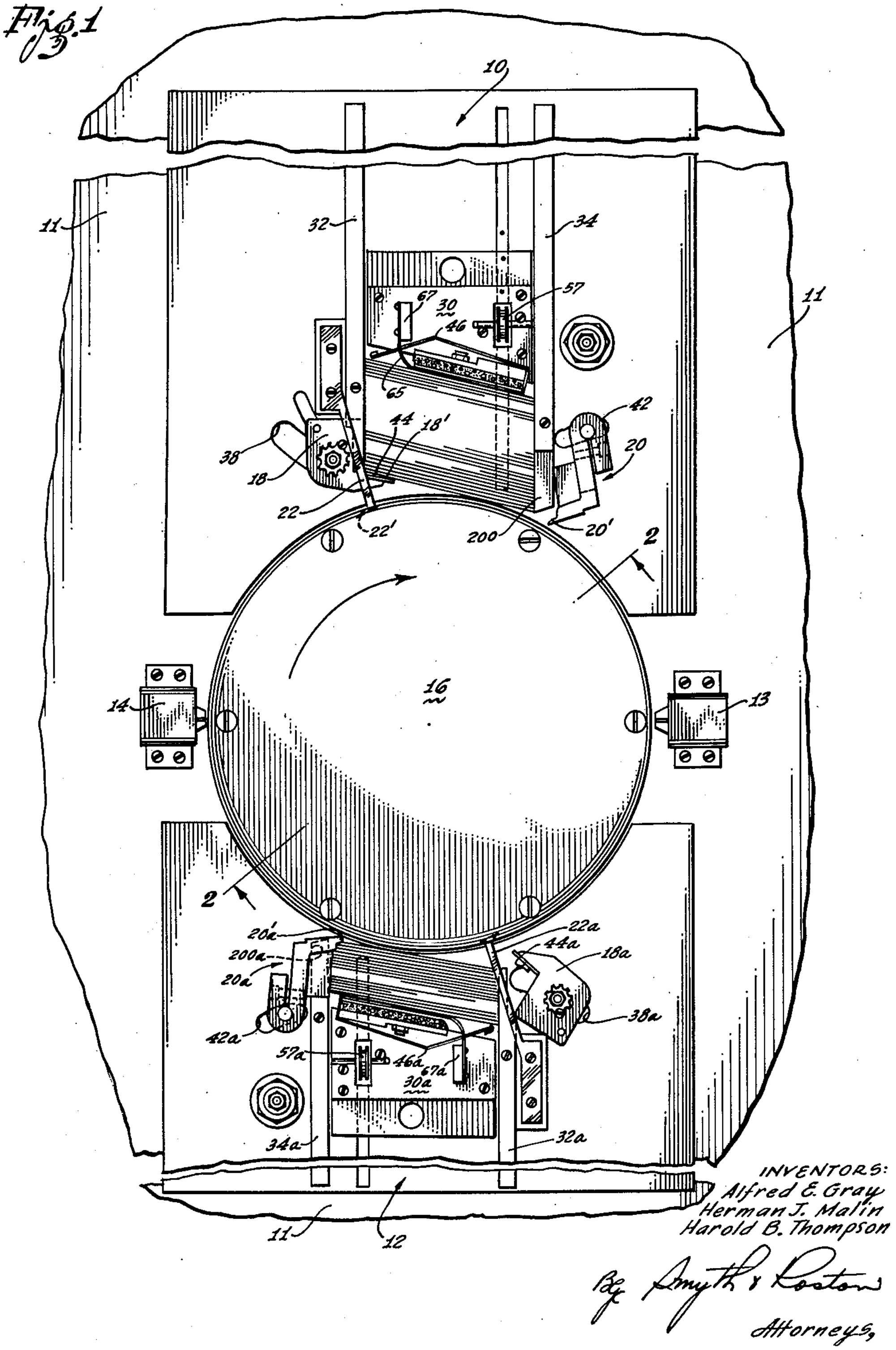

The present invention relates to card processing apparatus of the type in which information storage cards may be sorted, merged, collated or otherwise handled; or in which such cards may be processed so that the data on the cards may be read, or new data may be recorded on the cards. The invention is more particularly concerned with an improved feeding-stacking station for use in conjunction with such apparatus.

The information storage cards referred to above may have data recorded on them in a variety of different ways and in accordance with a variety of techniques. This data, for example, may be represented by a binary or other digital code which consists of a plurality of magnetic areas on the individual cards. When such recording is utilized, a first magnetic polarity may be considered as representing binary "1," and a second magnetic polarity may be considered as representing binary "0."

The present invention will be described as utilized in apparatus for processing and handling information storage cards on which pertinent information is recorded as magnetic recordings and by magnetic means, as described in the preceding paragraph. It should be pointed out, however, that other types of recordings are also suitable. For example, the data may be represented by patterns of holes, or by black and white areas, or by any other suitable means. The apparatus to be used will be generally similar regardless of the recording technique. It is usually only necessary that the proper type of transducers by provided for converting the particular type of recording into electrical signals, and vice versa.

The present invention, as noted above, is directed to an improved feeding-stacking station which may be used in card processing apparatus. The station of the invention serves to hold a stack of information storage cards adjacent a transport medium. The station may be actuated to a feeding mode in which the cards in the station may be controllably and successively fed to the transport medium, and it may be actuated to a stacking mode in which cards transported to it by the transport medium may be deposited in succession in the station.

The cards fed to the transport medium by the feeding-stacking station of the invention may be carried by the medium to a processing station where information on the cards may be read, or where new information may be recorded on the cards. After processing at the processing station, the cards may be sorted, or otherwise handled, and they may then be returned to the same or to another feeding-stacking station.

Many problems have been encountered in the provision of feeding-stacking stations which are capable of handling a relatively large number of cards, and which are also capable of feeding the cards successively to the transport medium without jamming and of receiving cards successively from the transport medium, likewise without jamming.

Copending application Serial No. 717,270, which was filed February 24, 1958 in the name of Eric Azari et al., now U.S. Patent No. 2,947,538, discloses a feeding-stacking station in which the trailing wall of the station defines a throat with the transport medium. This throat is formed by the provision of an integral tongue portion which extends from the end of the trailing wall of the station into close proximity with the surface of the transport medium. The tongue defines with the transport medium a throat which is just wide enough to allow a single card only to pass from the station to the transport medium at any one time.

The feeding-stacking station of the copending application also includes a stack head which is movable from a stand-by position to an operative position when it is desired to transfer cards sequentially from the transport medium to the station. The stack head is provided with a central slot which receives the tongue referred to above when the stack head is so moved to its operative position.

The cooperation of the slotted stack head and tongue enables the stack head of the copending application to fill the throat when the feeding-stacking station is actuated to its stacking mode. The heighth of the stack head may be made to correspond to the width of the cards so that each card is arrested by the stack head by an impacting force extending along the entire leading edge of the card, instead of being concentrated at a portion of the leading edge. This tends to prolong the life of the cards in that it prevents excessive wear at concentrated parts of their leading edges.

The feeding-stacking station of the copending application also includes a pusher member which is resiliently biased towards the mouth of the station. This pusher serves to maintain the cards in the station in a generally stacked condition. It is important that such a pusher move uniformly and easily within the station so that the stack of cards will be urged forward towards the mouth of the station with a constant and uniform pressure. This requirement is achieved in the feeding-stacking station of the copending application by use of a tapered resilient spring strip which coils about a rotatable bearing on the pusher, and by the use of a polytetrafluorethylene (Teflon) flat base for the pusher which moves along the floor of the station with a uniform low-friction rubbing contact.

The tapered spring referred to in the preceding paragraph provides an increased biasing pressure for the pusher with increased distance of the pusher from the mouth of the station. This enables the biasing pressure exerted on the cards in the station by the pusher to decrease as the stack of cards diminishes due to cards being successively fed from the station to the transport medium. The net result is that the leading cards are biased against the mouth of the station by the pusher with substantially the same force, regardless of the number of cards in the station.

The pusher member of the feeding-stacking station of the copending application is also provided with a sponge rubber pad which functions as a shock absorber and which enables cards to be smoothly fed into and out of the station at a relatively fast rate. The pad bears against the rear surface of the front card of the stack as the cards are fed into the station, and it helps to prevent damage to the cards during that operation.

The feeding and stacking station of the copending application is also provided with a feed head, and a vacuum pressure is controllably established at a face of the feed head against which the leading card in the stack rests. The feed of cards out of the station can then be controlled by controlling the vacuum pressure provided at that face of the feed head.

The present invention is concerned with a feeding-stacking station of the general type disclosed in the copending application and described in the preceding paragraphs. The station of the present invention is particularly unique and advantageous in its inclusion of a means for urging the last few cards in the station against the transport medium when the station is in its feeding mode and when the end of the stack of cards previously held in the station is reached.

The inclusion of the means referred to above in the improved station of the present invention solves a problem which has been troublesome at times in the past. As noted previously, it is desirable that the feeding-stacking stations be capable of handling relatively large numbers of cards in a stacked condition. It is also desirable that each and every one of the cards in the relatively large stack be fed without jamming to the transport medium. However, even though stations of the type described in the copending application have been constructed to operate with a high degree of satisfaction, difficulties have been encountered during the feeding mode of the stations in assuring that the last few cards in the stack will be positively fed to the transport medium without a jamming condition being encountered.

The means utilized in this invention to accomplish the results referred to in the preceding paragraphs is in the form of a flap which is affixed to the pusher member. This flap may be formed of mylar, or other suitable material, and it is supported by the pusher member so as to extend across the front of the sponge rubber face referred to above. The flap is resilient in nature, and it is mounted to have a tendency to move outwardly from the face of the pusher member and at an angle to that face. However, the flap is held flat against the sponge rubber face of the pusher member when there are any appreciable number of cards stacked in the station and the flap is then ineffective.

However, in the feeding mode of the station and when the end of the stack is reached, the flap swings outwardly from the face of the sponge rubber portion of the pusher and urges the leading ends of the remaining cards forwardly against the surface of the transport medium. This action of the resilient flap eliminates any tendency to obtain the difficulties discussed above, in that it positively assures that the leading edges of the last few cards in the stack will be properly positioned to be fed successively to the transport medium. This positively assures that the entire stack of cards in the improved station of the invention, including the last few remaining cards in the stack, will be individually fed in sequence to the transport medium without any tendency for jamming.

The flap described in the preceding paragraphs is also helpful and beneficial when the feeding-stacking station is conditioned to its stacking mode. The flap then acts as a brake for the first cards fed into the station as it is inclined out from the face of the pusher and it presses against the surface of the transport medium. The flap now serves to slow these cards down as they come against the stack head. This reduces the impact force of the cards against the stack head, and the cards are prevented from bouncing back from the feed head. Excessive wear of the leading edges of these cards, due to impacting with the stack head, is also prevented.

The pusher member of the improved feeding-stacking station of the invention is also provided with a guide which engages a channel in the base of the station. This channel conveniently carries the tapered spring referred to above, and it also serves as a guide channel for the guide on the pusher. The guide on the pusher is preferably provided with a base composed of low-friction material such as Teflon. The guide serves to keep the pusher member oriented in the station and out of contact with the side walls of the station. This cooperation of the guide and the channel serves to provide a low-friction sliding motion for the pusher member, and it also obviates any tendency for the pusher to cock against the side walls of the station and become jammed.

The pusher member of the station of the invention is therefore capable of moving smoothly and effortlessly forward when the station is in its feeding mode to maintain the cards in a stacked condition and biased against the feed head and against the transport medium. The pusher of the station of the invention is also capable of moving smoothly back against the force of the spring strip when the station is in its stacking mode and as the cards are fed in succession into a stacked condition in the station.

Other features and advantages of the invention will become apparent upon a consideration of the following specification in conjunction with the accompanying drawings.

Figure 2:
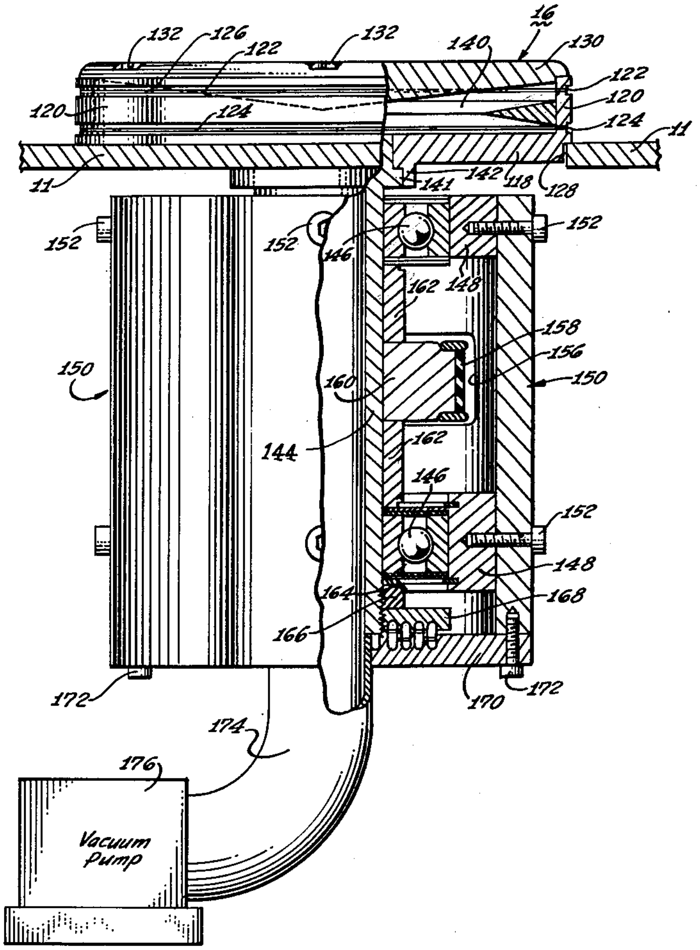
Figure 3:
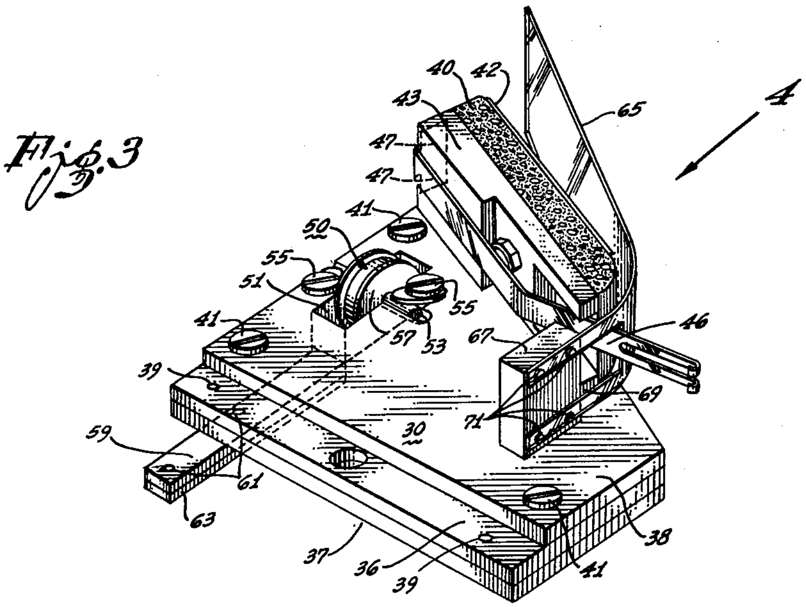
Figure 4:
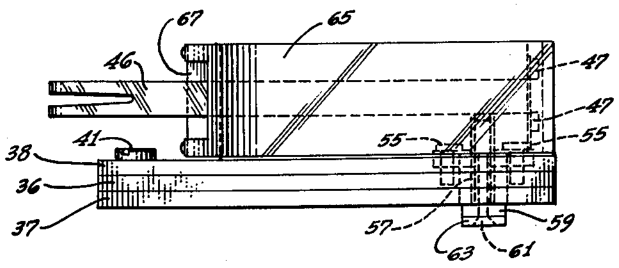
Figures 5, 6:
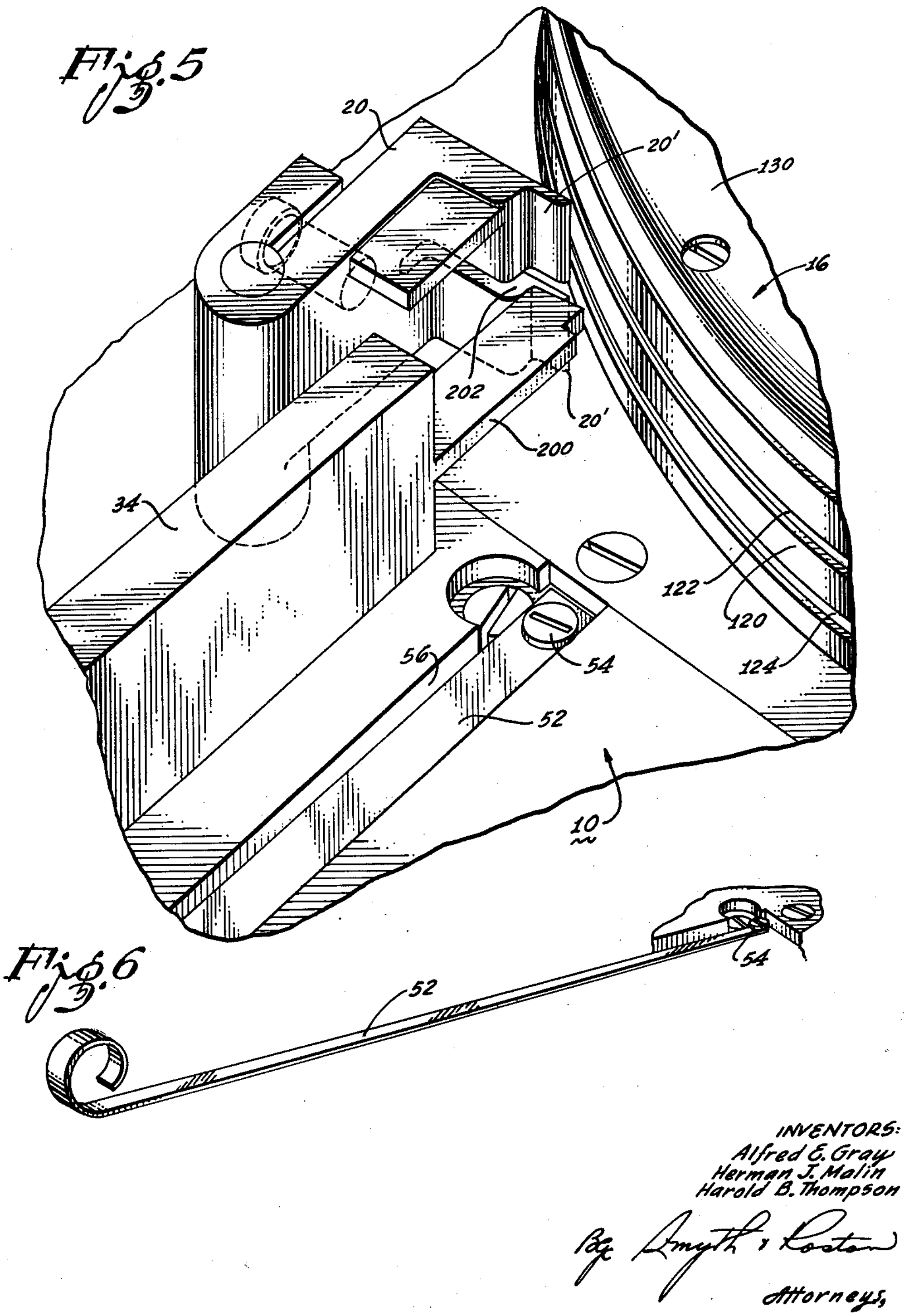
Figures 7, 8:
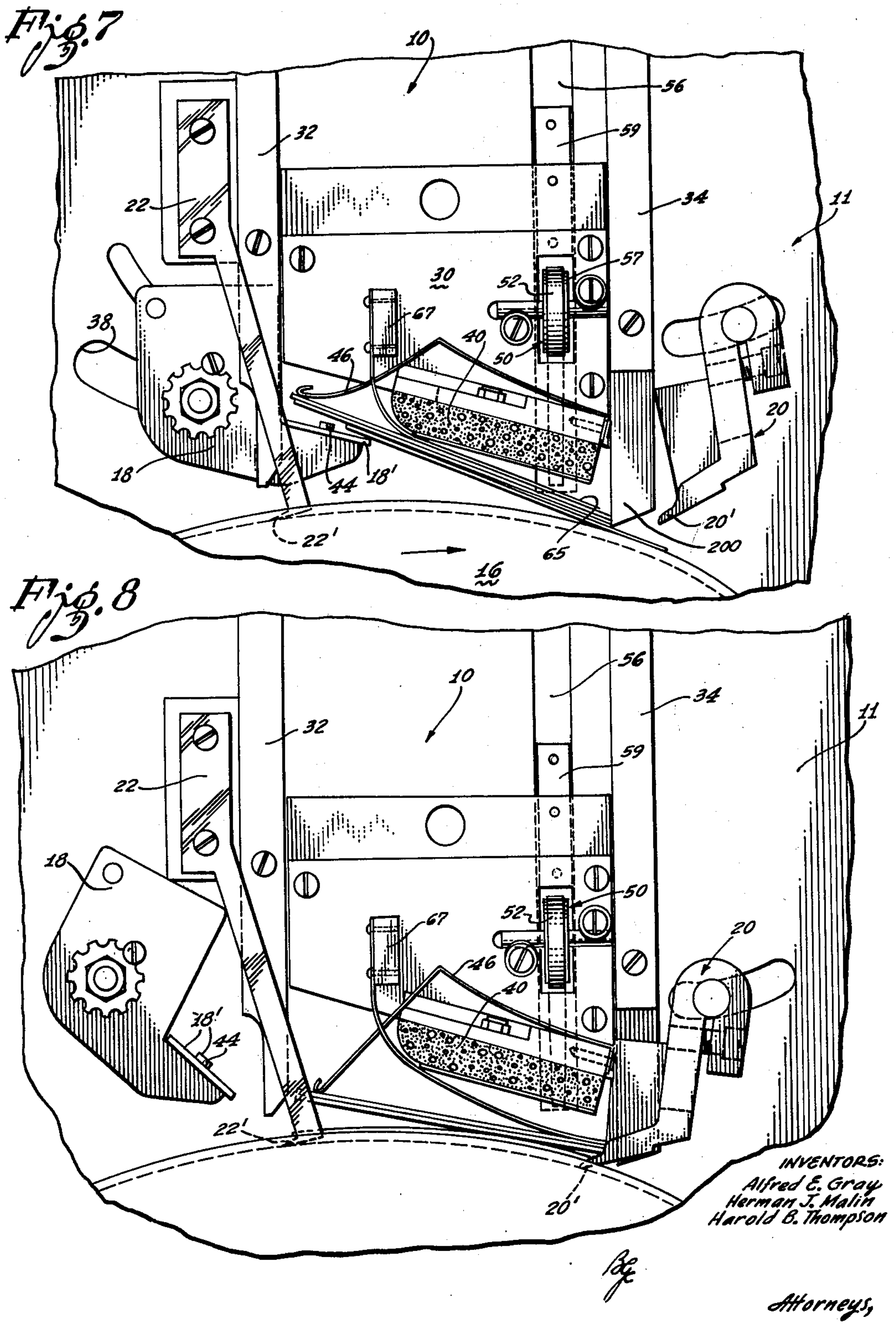

In the drawings:

FIGURE 1 is a top plan view of a simplified card processing apparatus incorporating feeding-stacking stations constructed in accordance with the concept of the present invention, this view illustrating a pair of such feeding-stacking stations disposed contiguous to a rotatable vacuum pressure transporting drum and constructed to feed information storage cards to the transport drum in succession, and to successively receive information storage cards from the drum;

FIGURE 2 is a sectional view substantially on the line 2—2 of FIGURE 1 and showing the constructional details of the rotatable drum of FIGURE 1 and the manner by which the drum produces a vacuum pressure at its peripheral surface, this vacuum pressure serving to hold the information storage cards rigidly on the peripheral surface for transportation from the feeding-stacking station to a processing station and for a subsequent return to the same or a different feeding-stacking station;

FIGURE 3 is an enlarged perspective view of a pusher member and its associated elements which serve as components of the improved feeding-stacking station of the invention; this view also showing an improved flap member which, in accordance with the concepts of the present invention, assures that the last few remaining cards in the station will be positively fed to the transport drum and which also serves as a buffer, or brake, for the first few cards fed into the station when the station is in its stacking mode;

FIGURE 4 is a front view of the pusher member of FIGURE 3 and further illustrates the various components of the assembly including the pusher member;

FIGURE 5 is a perspective fragmentary view, on an enlarged scale, of a portion of the feeding-stacking station with which the present invention is concerned, this view clearly showing the manner in which a tongue is provided to form a throat for the cards released from the station so that such cards may be individually released in sequence, and also showing a movable stack head which is included in the station and which has a central groove to receive the tongue when the stack head is moved to an operative position;

FIGURE 6 is a fragmentary view showing a tapered resilient strip which is supported at its narrow end in the station of the invention and which serves to bias the pusher member of FIGURE 3 towards the mouth of the station with a pressure which increases as the distance of the pusher from the mouth increases, for the reasons referred to above;

FIGURE 7 is an enlarged fragmentary top plan view of a portion of a feeding-stacking station constructed in accordance with the invention, this view illustrating the station in its feeding mode and showing the action of the flap member in positioning the last few cards of a stack of cards previously held in the station, so that the last few cards may be properly fed to the transport drum without jamming; and FIGURE 8 is an enlarged view similar to the view of FIGURE 7, with the latter view showing the station in its stacking mode and illustrating the manner in which the flap member serves as a brake on the first few cards transported to the mouth of the station by the transport drum.

In the apparatus of FIGURE 1, suitable transport means such as a rotatable vacuum pressure drum 16 is provided. The drum 16 is mounted on a horizontal table top 11 for rotation in a clockwise direction about a vertical axis. The drum is constructed in a manner to be described so that it may exert a vacuum pressure at its peripheral surface. This, as noted above, enables the drum to firmly retain the information storage cards at fixed angular positions about its periphery so that these cards may be transported by the drum.

It should be appreciated that the transport means does not necessarily have to be movable in a closed loop, such as is the case with the motion of the drum 16. Moreover, the transport means itself does not have to be movable, it being necessary only for the transport means to provide a movement for the cards along a desired path. It should also be appreciated that the cards may be any type of discrete element capable of recording and subsequently obtaining a reproduction of digital information.

A first feeding-stacking station 10 is mounted on the table top 11 with its mouth contiguous to the peripheral edge of the drum 16. A second feeding-stacking station 12 is also mounted on the table top 11, and the second station is illustrated as being positioned diametrically opposite to the station 10. The feeding-stacking station 12 also has its mouth disposed in contiguous relationship with the drum 16.

A first transducer means 13 is mounted on the table top 11, and this transducer means is positioned between the stations 10 and 12. A second transducer means 14 is also mounted on the table top 11, and the second transducer means is positioned on the opposite side of the drum 16 from the transducer means 13. The transducer means 13 and 14 may be any suitable and well known type of electro-magnetic type of transducer head, or plurality of such heads. For example, these transducer means may be constructed in a manner similar to that described in copending application Serial No. 550,296, filed December 1, 1956 in the name of Alfred M. Nelson et al., now U.S. Patent No. 3,032,750. As noted above, when recordings other than magnetic are used on the cards, the transducer means then are suitable corresponding types, such as mechanical or photo-electric transducers, etc.

The feeding-stacking station 10 has a vacuum pressure feed head 18 which is movably mounted adjacent the leading wall, or guide rail, 32 of the station. The feeding-stacking station also includes a stack head 20 which is movably mounted adjacent the trailing wall, or guide rail, 34 of the station. The leading and trailing walls referred to immediately above are referenced with respect to the movement of cards on the transport drum 16.

The construction and operation of the feed head 18 and of the stack head 20 may be similar to that described in copending application Serial No. 645,639 filed March 12, 1957 in the name of Alfred M. Nelson et al., now U.S. Patent No. 2,969,979. It is believed unnecessary to include a detailed description of the constructional details of the feed head in the present application. It should be pointed out, however, that the feed head 18 is controlled to exert a vacuum pressure at its surface 18' when the station 10 is in its feeding mode and the feed head is in its operative position. This vacuum pressure is exerted on the trailing portion of the leading card in the station. The same leading card rests on the peripheral surface of the drum 16, and the drum also exerts a vacuum force on this card. The stack head 20 is withdrawn to its stand-by position when the station is in its feeding mode, and the feed head 18 is in its operative position during that mode.

The vacuum force exerted on the face of the leading card by the drum 16 tends to withdraw the leading card from the feeding-stacking station 10; whereas, the vacuum force exerted on the face of that card by the surface 18' of the feed head 18 tends to retain that card in the station. The force exerted by the feed head 18 is made the greater of these two forces so that it is able to overcome the force exerted on the cards at the peripheral surface of the drum 16. So long as the leading card is held in this manner in the station 10, the other cards supported in stacked relationship in the station behind the leading card are also held in place in the station. The cards are so held in the station in a generally stacked relationship with the lower edges of the cards resting on the surface of the table top 11.

Whenever the vacuum pressure at the surface 18' of the feed head 18 is interrupted, the leading card in the feeding-stacking station is withdrawn by the drum 16. The interval of the interruption in the vacuum pressure to the feed head 18 may conveniently be made such that only one card can be released from the station 10 to the peripheral surface of the drum 16. The next card in the station now comes into the leading position, and it is retained in the station in the manner described until the next interruption of the vacuum pressure to the feed head 18. Moreover, when the vacuum pressure to the feed head is interrupted for a relatively large length of time, the cards are fed in succession from the station to the peripheral surface of the transport drum.

In the stacking operational mode of the feeding-stacking station 10, the feed head 18 is withdrawn to its stand-by position and its vacuum pressure is turned off in the manner explained in the copending application 645,639 referred to above. At the same time, the stack head 20 is moved into close proximity with the peripheral surface of the drum 16. When the station is in this latter stacking operational mode, any card transported by the drum 16 to the stack head is arrested.

A pick-off member 22 is mounted adjacent the leading wall of the feeding-stacking station 10. This pick-off member has a series of fingers 22' which extend into peripheral grooves formed around the periphery of the drum 16 and spaced axially from one another. The stack head 20 also has fingers 20' which extend into these peripheral grooves.

The fingers 22' of the pick-off member 22 are arcuate in shape and have central potrions which are displaced radially outwardly from the periphery of the drum 16. This construction of the pick-off member 22 causes the cards transported by the drum to ride up over its fingers and to be lifted outwardly from the periphery of the drum. Also, each card arrested by the stack head 20 will have its trailing edge projecting tangentially to the periphery of the drum and over the fingers 22' of the pick-off member 22. The next succeeding card transported by the drum 16 will then ride over the fingers 22' of the pick-off member 22 and under the preceding card so as to pry the preceding card from the periphery of the drum. This succeeding card is also arrested by the stack head 20 and the preceding card is deposited by the succeeding card into the station 10.

The feeding-stacking station 12 of FIGURE 1 may be constructed in a manner similar to the construction of the station 10 and, for that reason, its components are numbered with the same numbers as the components of the station 10, but with an *"a"* designation. An examination of FIGURE 1 will reveal that the station 10 is illustrated as being in its feeding mode of operation in which the feed head 18 is moved forward to an operational position and the stack head 20 is withdrawn to a stand-by position. The station 12, on the other hand, is illustrated in FIGURE 1 as being in its stacking mode of operation in which its stack head **20*a* is moved forward to an operative position and its feed head 18*a*** is withdrawn to a stand-by position.

The feed head and stack head of the feeding-stacking stations 10 and 12 may be operated by an appropriate system of cams and levers. The actual operation of these heads between their operative and stand-by positions is fully described in the copending application 645,639 referred to above. Since the actual control of the stack head and the feed head for each station does not form a part of the present invention, such a control will not be described in detail. It should be appreciated, however, that any suitable control can be provided to move the feed heads and stack heads between their operative positions and their stand-by positions.

The feeding-stacking station 10 in its feeding mode of operation may contain a plurality of information storage cards supported in the station in a stacked relationship. In the feeding mode, the station 10 is conditioned to controllably feed cards in a one-by-one sequence to the periphery of the drum 16. The feeding-stacking station 12 at this time is in its stacking mode so that cards transported to its stack head are deposited one after the other in that station. The cards from the feeding-stacking station 10 may now be controllably fed to the periphery of the transport drum 16 and transported by that drum past the transducer means 13 for processing. After processing of the cards by the transducer means 13, the cards may be deposited in the feeding-stacking station 12.

At the completion of the operation described above, when the feeding-stacking 10 is empty and all the cards have been transferred to the station 12, the operational modes of the stations 10 and 12 may be reversed so that the cards may be returned by the transport drum 16 in their original order to the station 10. The cards may be further processed by the transducer means 14 as they are so returned to the station 10.

As illustrated in FIGURES 1, 3 and 4, a pusher member 30 is included in the feeding-stacking 10, and a similar pusher member 30*a* is included in the feeding-stacking station 12. The pusher 30 is adapted to move along the floor of the feeding-stacking 10 between a pair of spaced parallel guide rails 32 and 34 which constitute the leading and trailing and side walls of the station, referred to above. These guide rails are spaced apart a distance corresponding essentially to the length of each card supported in stacked condition in the station.

The purpose of the pusher 30, as noted above, is to maintain the cards in a stacked relationship in the station. To accomplish this purpose, the pusher member is biased in the direction of the mouth of the station resiliently to urge the cards forward in the station. This is so that the leading card rests against the surface 18' of the feed head 18 and against the peripheral surface of the drum 16 when the station is in its feeding mode, and so that the leading card will rest against the stack head 20 and against the pick-off 22 and the peripheral surface of the drum 16 when the station is in its stacking mode.

As the cards are fed out of the feeding-stacking station 10, the pusher 30 moves forwardly to exert a continuous pressure on the remaining cards so as to hold the remaining cards in a stacked relationship in the station. Conversely, when cards are fed into the station 10, the pusher 30 is moved backwardly against its spring pressure so that it still exerts a force on the cards in the station to maintain them in a stacked relationship.

The pusher member 30 (FIGURE 3) includes a flat base member 36 which may be formed of brass or any other appropriate metal and which is dimensioned to fit between the guide rails 32 and 34 of the station 10. The flat base member 36 has a similar flat member 37 affixed to its lower surface, for example, by a plurality of flat-headed screws 39 which extend through the base member 37 and up through the base member 36. The base member 37 may be composed, for example, of Teflon which is the trade name of polytetrafluoroethylene, as mentioned above. Teflon possesses a relatively low coefficient of friction, and it provides an ideal bearing surface for the pusher 30 against the floor of the feeding-stacking station 10.

The pusher also includes a plate 38 which is secured to the base plate 36 by a plurality of screws 41. An upright bracket 43 is secured to the plate 38 by means of screws (not shown) which extend upwardly from the bottom of the assembly. The bracket 43 extends along the forward edge of the plates 38 and 36, and it supports a sponge rubber pad 40 on its front face. A thin sheet of a suitable thin, resilient material such as mylar, designated 42, is affixed to the front face of the sponge rubber pad 40. The bracket 43 may be composed of an insulating material such as Bakelite, and the sponge rubber pad 40 may be glued to the front face of the bracket. Likewise, the mylar sheet 42 may be glued to the front face of the pad 40. The sponge rubber pad 40 is adapted to form a resilient backing for the sheet 42, and the sheet bears against the stack of cards in the feeding-stacking station 10. These elements provide a cushion-like shock absorber surface for the cards to prevent damage as the cards are deposited into the station.

The feed head 18 may include a pair of switch contacts 44 (FIGURE 4) on its surface 18'. These switch contacts are engaged by a switch armature 46 which is carried by the bracket 43. The armature 46 may be composed of any suitable resilient electrically conductive material, such as brass or beryllium copper, and it is secured at one end to an end of the bracket 43 by suitable screws 47. The armature, as illustrated in FIGURE 3, extends across the back of the bracket 43 and has a free extremity which extends beyond the forward edge of the plate 38. The switch armature 46 serves to short circuit the contacts 44 when the station is empty. At other times, the presence of a card in the station separates the switch armature 46 from the contacts 44, as shown, for example, in FIGURE 1.

The copending application 645,639 referred to above describes an electric control circuit which responds to such a switch actuation to provide required controls for the station. For example, the provision of the switch contacts 44 and the resilient switch armature 46 enables a control circuit to reverse the operational modes of the stations 10 and 12 of FIGURE 1 after the last card has left either station. This permits the apparatus of FIGURE 1 to proceed automatically from one pass to another in the processing of the information storage cards.

A ball bearing assembly 50 is rotatably mounted in a slot 51 in the plate 38 and in correspondingly aligned slots in the plates 36 and 37. The assembly is rotatably mounted on a shaft 53 which is secured to the plate 38 by a pair of screws and clamps 55. The ball bearing assembly 50 includes a rotatable member 57 which has outwardly extending rims formed on each side.

A tapered resilient spring strip 52 (see FIGURE 6) is supported on its narrow end on the table top 11 adjacent the mouth of the station by means, for example, of a screw 54 (see also FIGURE 5). The tapered resilient strip 52 extends upwardly through the slots in the base plates of the pusher member and around the peripheral surface of the rotatable member 57 of the bearing 50 between its rims. The strip 52 has a tendency to coil itself into a coiled configuration, and in so doing it causes the bearing 50 to rotate and to resiliently bias the pusher assembly 30 towards the mouth of the station 10.

The taper on the strip 52, as described in copending application 717,270, referred to above, causes it to exert a greater force as the distance of the pusher 30 from the mouth of the station is increased. This provides for a greater force against the stack of cards in the station 10 as the number of cards in the stack increases. This, in turn, provides for a substantially constant biasing force against the leading card in the station. The use of the tapered resilient strip 52 overcomes any tendency for the stacked cards in the station to be biased with an excessively high force when relatively few cards are in the station. The taper in the strip 52 also overcomes any tendency for the stacked cards in the station to be biased with an unduly low force when a large number of cards are stacked in the station. The use of the tapered strip 52, therefore, permits a relatively large number of cards to be handled in the station while exerting an optimum force against the leading card in the station at all times.

The use of the ball bearing 50 and of the Teflon base plate 37 assures that the pusher member 30 will move with a constant and uniform pressure back and forth in the station 10 as the cards move in and out of the station. This prevents any excessive jarring or jamming of the cards as they move in and out of the station.

As shown in FIGURES 1, 5 and 7, for example, the spring strip 52 is adapted to lie in a groove 56 which extends the length of the station 10. A guide 59 (FIGURE 3) having an elongated rectangular configuration is secured to the lower surface of the Teflon plate 37 by means, for example, of a pair of screws 61 which extend upwardly through the guide 59 and through the plates 36 and 37. The guide 59 is disposed in the groove 56 when the pusher assembly 30 is positioned in the station 10. The guide 59 has a plate 63 secured to its bottom surface by a plurality of screws, such as the illustrated screws 61. The plate 63 may also be composed of Teflon. The guide 59 engages the groove 56 and serves as a guide for the pusher 30. This guide assures that the base plates 36, 37 and 38 will be held out of contact with the guide rails 32 and 34 so that any possibility of the pusher 30 becoming misaligned and cocked within the station 10 is prevented.

Further in accordance with the present invention, a resilient flap member 65 is secured at one end to an upright post 67 which, in turn, is supported on the plate 38. The flap 65 is supported and shaped to extend around one end of the bracket 43 and of the sponge rubber pad 40. The flap member has an aperture 69 formed in it to receive the free end of the switch armature 46. As illustrated in FIGURE 3, the flap 65 is secured to the post 67 by a pair of screws 71.

The resilient nature of the flap 65 is such that it is inclined normally to the pad 40 and its free end normally extends outwardly from the front surface of the sheet 42 on the pad. However, when there are a sufficient number of cards in the station 10, the resulting stack of cards forces the flap 65 back against the front face of the sheet 42. On the other hand, when there are only a few cards in the station, and as will be described subsequently in conjunction with FIGURES 7 and 8, the flap 65 swings out to its inclined position and the free end of the flap moves outwardly to approximate the position illustrated in FIGURES 3. In this manner, and as will be described, the flap serves to urge the last few remaining cards against the surface of the transport 16 and in proper position to be fed to the drum.

As also will be described, the extended inclined position of the flap 65 at the beginning of a stacking mode causes the cards transported to the mouth of the feeding-stacking station effectively to be braked so as to prevent undue impact and bounce of the cards against the stack head. This could lead to jamming of the cards at the mouth of the station, and it could also lead to undue wear at the leading edges of the cards due to the impacting force against the stack head.

As noted above, the enlarged fragmentary view of FIGURE 7 shows the station 10 in its feeding mode and at the end of a feeding operation when just a few cards remain in the station. Without the improved pusher assembly of the present invention, these cards may occasionally have a tendency to become misaligned and jammed during the feeding operation. However, and as illustrated in FIGURE 7, under these conditions the flap 65 swings outwardly from the sponge rubber cushion 40 and against the cards remaining in the station to urge the leading edges of the cards against the periphery of the drum 16 and in the proper position to be controllably fed to the drum without misalignment and without jamming.

FIGURE 8, as mentioned above, illustrates the station 10 in its stacking mode, and at the beginning of a stacking operation. It will be observed that the flap 65 again bears against the leading edges of the cards in the station to move the cards against the drum 16. This initial inclination of the flap has a tendency to cause the cards to brake the following cards which are driven against the stack head 20 by the drum 16. The flap 40 then effectively slows down these cards to reduce the impact force of the cards against the stack head. This action continues until there are sufficient cards in the station to force the flap 65 back against the cushion 40, at which time the stack of cards themselves provide adequate braking for the cards carried to the mouth of the station by the transport drum 16.

Details of the vacuum transport drum 16 are shown in FIGURE 2. This drum is similar in its construction to the rotatable transporting drum disclosed and claimed in copending application Serial No. 600,975 filed July 30, 1956 in the name of Loren R. Wilson, now U.S. Patent No. 2,883,189.

As shown in FIGURE 2, the vacuum pressure transporting drum 16, which is assumed to be rotatable in a clockwise direction in FIGURE 1, is made up of a lower section and an upper section. The lower section includes a disc-like bottom portion 118 and an annular side portion 120, these portions being integral with one another. A pair of axially spaced peripheral orifices 122 and 124 extend through the side portion 120. Each of these orifices is discontinuous in that it is interrupted at selected intervals about its angular length by ribs 126. These ribs are integral with the side portion 120. The orifices 122 and 124 each has an external peripheral annular groove or channel for receiving the fingers 22′ of the pick-off 22 and the fingers 20′ of the stack head 20, as mentioned above. This engagement of the fingers of the pick-off and of the stack head with the peripheral grooves in the drum permits a close engagement of these members with the peripheral edge of the transport drum. This makes is possible for the cards to be removed from the periphery of the drum and deposited in the feeding-stacking station.

The disc-like bottom portion 118 of the lower section of the drum is undercut, as shown at 128. This is so that the end of this portion will have a reduced diameter with respect to the outer diameter of the annular side portion 120. This enables the edge of the table top 11 to extend beyond the outer limits of the side portion 120. Therefore, even without excessively close tolerances between the edge of the table top 11 and the rotating surface of the drum 16, the cards supported endwise on the table top in the feeding-stacking stations 10 or 12 have no tendency to slip down between the table and the drum to become misplaced and damaged.

The upper section of the drum 16 is in the form of a disc-like member 130 which engages the annular side portion 120 of the lower section. The disc-like member 130 forms an enclosure with the lower section of the drum, and it is parallel to the disc-shaped bottom portion 118 of the lower section. The disc-like member 130 is held in place on the annular side portion 120 by a plurality of screws 132.

A deflector ring 140 is supported within the interior of the drum 16 in press-fit with the inner surface of the annular side portion 120. This deflector ring is tapered toward the center of the drum to prevent turbulence and to provide a streamlined path for air which is drawn in through the orifices 122 and 124.

The bottom portion 118 of the lower section of the drum 16 contains a central opening surrounded by an annular collar 141. The collar 141 surrounds a collar 142 which is provided at one end of a hollow shaft 144. The drum 16 is supported on a shoulder formed by the collar 142, and the end of the shaft extends into the opening in the bottom portion 118 in friction-fit with that portion. Therefore, rotation of the hollow shaft 144 causes the drum 16 to rotate. Also, the interior of the hollow shaft 144 communicates with the interior of the drum.

Bearings 146 are provided at opposite ends of the shaft 144. The inner races of these bearings are mounted on the shaft, and their outer races are disposed against bushings 148. The bushings 148 are secured to a housing 150 by means of a plurality of studs 152.

An arcuate opening 156 is provided in the housing 150 between the bearings 146. This opening enables a drive belt 158 to extend into the housing and around a pulley 160. The pulley is keyed to the shaft 144 between the bearings 146, and the pulley is held against axial movement by a pair of sleeves 162. In this way, the shaft 144 and the drum 16 can be rotated by a suitable motor (not shown), the motor being mechanically coupled to the pulley 160 by the drive belt 158.

The bearings 146 and the sleeves 162 are held on the shaft 144 by a nut 166. The nut 166 is screwed on a threaded portion at the bottom of the shaft, and a lock washer 164 is interposed between it and the lower bearing. A sealing disc 168 is also screwed on the threaded portion of the bottom of the shaft 144. The sealing disc 168 operates in conjunction with a bottom plate 170 to resist the movement of air between the interior of the housing 150 and the interior of the hollow shaft 144 when a pressure differential exists between the housing and the shaft.

The bottom plate 170 is secured to the housing 150 by a plurality of screws 172, and it has a central circular opening. A hollow conduit 174 extends into the opening in friction-fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and, for that reason, is shown merely in block form.

The vacuum pump 176 draws air inwardly through the orifices 122 and 124, through the interior of the drum 16, down the shaft 144 and through the conduit 174. This creates a vacuum pressure at the outer peripheral surface of the annular portion 120 of the lower section of the drum. This vacuum pressure serves to firmly retain the cards received from the feeding-stacking stations 10 and 12 on that surface as such cards are transported by the drum between these two stations.

When the station 10, or the station 12, is conditioned to its feeding mode, it is desired that the cards fed from this station will pass in a one-by-one sequence to the periphery of the drum 16, as mentioned above. This is achieved in the improved feeding-stacking station of the present invention by the provision of a tongue 200 (FIGURES 1 and 5).

The tongue 200, as shown in FIGURE 5, is secured to the leading edge of the guide rail 34 of the station 10, and it extends from that leading edge to a position closely adjacent the peripheral surface of the drum 16. As mentioned above, the tongue 200 may be made integral with the guide rail 34 if so desired.

The tongue 200 is positioned intermediate the top and bottom edges of the guide rail 34. The outer end of the tongue 200 is spaced from the periphery of the drum 16 within precisely controlled tolerances by a distance corresponding to slightly more than the width of one of the information storage cards, but less than the combined width of the two cards. Then, the cards may be fed from the station 10 (or from the station 12) by intermittently interrupting the vacuum pressure at the feed head 18 for a time sufficient to release one card only. Alternately, the vacuum pressure may be turned off for a longer interval, as mentioned above, at which time the cards will be fed individually and in sequence past the outer end of the tongue 200 and through the throat formed by the tongue and the periphery of the drum 16.

As illustrated in FIGURE 5, the stack head 20 is provided with a slot or groove 202 which receives the tongue 200 as the stack head is moved forward to its operative position. This enables the stack head to close the throat and properly perform its arresting function on the cards carried to the mouth of the station when the station is conditioned to a stacking mode.

The stack head 20 may have a width corresponding to the width of each card so that when it is moved to its operative position it arrests each card by exerting a force along the entire leading edge of each arrested card. This obviates the wear that is created due to shearing stresses when the width of the stack head is less than the width of the cards.

The invention provides, therefore, an improved feeding-stacking station for use in card processing apparatus. The improved station of the present invention is constructed to cooperate with the transport means of the apparatus, and it includes the means described above for assuring that none of the cards in the station will become misaligned or damaged, even though there are but a few cards remaining in the station during a feeding mode of operation or deposited in the station at the beginning of a stacking mode of operation.

The improved feeding-stacking station of the invention is also constructed in an improved and unique manner so that the pusher member included in the station to hold the cards in a stacked condition may be precisely and adequately guided, and so that the pusher member is capable of moving freely back and forth in the stations without any danger of that member becoming misaligned and jammed between the guide rails of the station.

We claim:

1. In apparatus for processing data on a plurality of information storage cards and which includes transport means for the cards, the combination of: a card feeding-stacking station having a mouth for disposition in contiguous relationship to the transport means and having a card supporting surface, a pusher member disposed to move on the card supporting surface towards and away from the mouth of the station, resilient means coupled to the pusher member for biasing the pusher member towards the mouth of the station so as to maintain the cards in the station in a stacked condition with one of the edges of each such card resting on the card supporting surface, and a control member resiliently mounted on the pusher member to extend between the pusher member and the cards in the station for a biasing of the control member against the pusher member by a relatively large stack of cards in the station but for a disposition of the control member away from the pusher member upon the occurrence of a relatively small number of cards in the station, to obtain a shifting of the cards towards the mouth of the station with an inclination to the transport means to provide for the smooth movement of the cards to and from the transport means.

2. In apparatus for processing data on a plurality of information storage cards and which includes transport means for the cards, the combination of: a card feeding-stacking station having a mouth for disposition in contiguous relationship to the transport means and having a card supporting surface, a pair of spaced guide rails extending along the card supporting surface from the mouth of the station, a pusher member disposed to move on the card supporting surface between the guide rails and in directions towards and away from the mouth of the station, a rotatable member mounted on the pusher member, a resilient strip member secured at one end to the card supporting surface at a position removed from the mouth of the station and positioned to coil about the rotatable member for biasing the pusher member towards the mouth of the station to maintain the cards in the station in a stacked relationship between the guide rails with the lower edges of the cards resting on the card supporting surface, and a control member resiliently mounted on the pusher member to extend between the pusher member and the cards in the station for a disposition of the control member against the pusher member upon the disposition of a relatively large number of cards in the station and for a disposition of the control member away from the pusher member upon the disposition of a relatively small number of cards in the station to obtain a shifting of the cards outwardly from the pusher member and towards the mouth of the station with an inclination to the transport means to provide for the smooth movement of the cards to and from the transport means.

3. The combination defined in claim 2 in which a channel is provided in the card supporting surface and in which the resilient strip member is disposed in the channel in the card supporting surface and in which the channel extends in a direction parallel to the guide rails and which includes a base plate for supporting the pusher member on the card supporting surface of the station, and which includes a guide member mounted on the under surface of the base plate to extend into the channel and serve as a guide for the pusher member.

4. In apparatus for processing data on a plurality of information storage cards and which includes transport means for the cards, the combination of: a card holding station having a mouth for disposition in coupled relationship to the transport means, a pusher member disposed to move in a direction towards and away from the mouth of the station and having a face disposed toward the cards in the station, resilient means coupled to the pusher member for biasing the pusher member towards the mouth of the station to maintain the cards in the station in a stacked condition, and a strip-like resilient control member having one end mounted on the pusher member and having its other end free, said control member extending across said face of the pusher member with the free end of the control member being displaced outwardly from said face in an angular relationship increasing in accordance with a decrease in the number of cards in the station to only a few cards.

5. In apparatus for processing data on a plurality of information storage cards and which includes transport means for the cards, the combination of: a card holding station having a mouth for disposition in coupled relationship to the transport means and having a card supporting surface, a pusher member disposed for movement on the card supporting surface in a direction towards and away from the mouth of the station and having a face for engaging the cards in the station, resilient means coupled to the pusher member for basing the pusher member towards the mouth of the station to maintain the cards in the station in a stacked condition with one of the edges of the cards resting on the card supporting surface, and a resilient flap-like member having one end mounted on the pusher member and having its other end free, said flap-like member extending across said face of said pusher member in a plane inclined to the plane of said face in accordance with a decrease in the number of cards in the station to a relatively small number.

6. In apparatus for processing data on a plurality of information storage cards and which includes transport means for the cards, the combination of: a card feeding-stacking station having a mouth and a card supporting surface and to be mounted with its mouth adjacent the transport means, a pusher member disposed to move on the card supporting surface towards and away from the mouth of the station and having a face for engaging a stack of cards in the station, resilient means coupled to the pusher member for biasing the pusher member towards the mouth of the station so as to maintain the cards in the station in a stacked condition with one of the edges of the cards resting on the card supporting surface, and a resilient flap-like member having one end mounted on the pusher member and having its other end free, said flap-like member extending across said face between the face and a stack of cards in the station so as to be normally biased back against the face by a relatively large stack of cards in the station but tending to extend across the face in a plane inclined thereto and with said free end tending to be displaced outwardly from said face for a relatively small number of cards in the station, the flap-like member tending to shift the relatively small number of cards outwardly from the pusher member and towards the mouth of the station with such an inclination to the transport means as to provide for the smooth movement of the cards to and from the transport means.

7. In apparatus for processing data on a plurality of information storage cards, the combination of: transport means for the cards, a card holding station constructed to hold a plurality of cards in stacked relationship and constructed and disposed relative to the transport means to obtain a sequential transfer of cards between the card holding station and the transport means, a pusher member disposed in the station for movement in a direction towards and a way from the mouth of the station and having a face for engaging the cards in the station, resilient means coupled to the pusher member for biasing the pusher member towards the mouth of the station to maintain the cards in the station in a stacked relationship, means coupled to the card holding station for operating on the cards in the station at particular times to obtain a controlled transfer of cards from the card holding station to the transport means and for operating upon the cards on the transport means at other times to obtain a controlled transfer of cards from the transport means to the card holding station, and a resilient control member coupled to the pusher member at one end of the pusher member and movable from the pusher member and against the cards upon the disposition of only a few cards in the station to pivot the cards in a direction for facilitating the movement of cards between the station and the transport means when relatively few cards are stored in the station.

8. In apparatus for processing data on a plurality of information storage cards, the combination of: transport means for the cards, a card holding station constructed to hold the cards in a stacked relationship and having a card supporting surface and having its mouth disposed adjacent the transport means to obtain a transfer of cards between the card holding station and the transport means, a pusher member disposed in the station to move on the card supporting surface in a direction towards and away from the mouth of the station and having a face for engaging the cards in the station, resilient means coupled to the pusher member for biasing the pusher member towards the mouth of the station to maintain the cards in the station in a stacked condition with one of the edges of the cards resting on the card supporting surface, and a resilient flap-like member having a free end and having its other end mounted on the pusher member, said flap-like member extending across said face of the pusher member in a plane inclined to the plane of the face of the pusher member and with the free end of the flap-like member being displaced outwardly from said face upon the disposition of a small number of cards in the station to obtain a positioning of the cards in the station against the transport means for facilitating the transfer of the cards from the station to the transport means and for providing a braking action against the cards transferred into the station from the transport means, and a channel disposed in the card supporting surface to guide the movement of the pusher member in a direction towards and away from the mouth of the station, the pusher member being constructed for movement in the channel.

9. In apparatus for processing data on a plurality of information storage cards and which includes transport means for the cards, the combination of: means including a card feeding station constructed to hold the cards in stacked relationship and provided with a mouth and positionable relative to the transport means to obtain a controlled transfer of cards from the transport means to the station through the mouth of the station, a pusher member disposed in the station for movement in a direction towards the mouth of the station, resilient means coupled to the pusher member for biasing the pusher member towards the mouth of the station to maintain the cards in the station in a stacked relationship, and a resilient control member coupled to the pusher member for pivotable movement toward the mouth of the station upon the disposition of a small number of cards in the station to facilitate the disposition of the cards in the station relative to the transport means to obtain a transfer of such cards to the transport means when a small number of cards remain in the station.

10. In apparatus for processing data on a plurality of information storage cards, the combination of: transport means for the cards, means including a card feeding station constructed to hold a plurality of cards in stacked relationship and having a card supporting surface and having a mouth disposed adjacent the transport means to obtain a sequential transfer of cards from the station to the transport means, a pusher member disposed in the station to move on the card supporting surface in a direction towards the mouth of the station and having a face for engaging the cards in the station, resilient means coupled to the pusher member for biasing the pusher member towards the mouth of the station to maintain the cards in the station in a stacked relationship with one of the edges of the cards resting on the card supporting surface, and a resilient control member having a free end and having its other end mounted on the pusher member, said control member extending across said face of the pusher member in a plane inclined to the plane of said face upon the disposition of a small number of cards in the station and with the free end of the control member displaced outwardly from said face to facilitate the disposition of the cards in the station against the transport means for a transfer of the cards from the station to the transport means when a small number of cards remain in the station.

11. In apparatus for processing data on a plurality of information storage cards which includes transport means for the cards, the combination of: means including a card stacking station constructed to hold the cards in a stacked relationship and positionable relative to the transport means to obtain a sequential transfer of cards from the transport means into the card stacking station, a pusher member operatively coupled to the cards in the station for movement in a direction away from the station and having a face for engaging the cards in the station, resilient means coupled to the pusher member for biasing the pusher member towards the mouth of the station to maintain the cards in the station in a stacked relationship, and a resilient control member coupled to the pusher member to provide a braking action for the cards being transferred from the transport means into the station.

12. In apparatus for processing data on a plurality of information storage cards, the combination of: transport means for the cards, a card stacking station constructed to hold the cards in a stacked relationship and provided with a card supporting surface and further provided with a mouth to obtain a transfer of cards from the transport means into the station and disposed relative to the transport means to receive cards from the transport means, a pusher member disposed in the station to move on the card supporting surface in a direction away from the mouth of the station and having a face for engaging the cards in the station, resilient means coupled to the pusher member for biasing the pusher member towards the mouth of the station to maintain the cards in the station in a stacked relationship with one of the edges of the cards resting on the card supporting surface, and a resilient flap-like member having a free end and having its other end mounted on the pusher member, said flap-like member extending across said face of the pusher member in a plane inclined to the plane of said face upon the occurrence of a small number of cards in the station and with the free end of the flap-like member being displaced outwardly from said face to provide a braking action against the cards transferred to the station from the transport means.

13. In apparatus for processing data on a plurality of information storage cards, transport means for the cards, means including a card holding station having an open mouth at one end of the station and disposed relative to the transport means and constructed to hold the cards in stacked relationship and to obtain a transfer of the cards between the station and the transport means through the mouth of the station means disposed in the station and operatively coupled to the cards and constructed to move in directions toward and away from the mouth of the station in accordance with the individual transfer of cards into and out of the station and constructed to maintain the cards in a stacked relationship in the station in accordance with the movement of such means toward and away from the mouth of the station, and means operatively coupled to such last mentioned means at one lateral end of such last mentioned means and extending along substantially the full transverse dimension of such last mentioned means and along substantially the full dimension of the mouth of the station in a direction transverse to the direction of movement of the cards toward and away from the mouth of the station and movable with the last mentioned means and operatively coupled to the cards in the station for varying the angle of inclination of the cards in the station in accordance with the number of cards in the station to facilitate the transfer of cards between the station and the transport means.

14. In apparatus for processing data on a plurality of information storage cards and which includes transport means for the cards, the combination of: a card holding station constructed to hold a plurality of cards and provided with an open mouth at one end disposed relative to the station to obtain a transfer of cards between the station and the transport means through the mouth of the station, means operatively coupled to the cards in the station at the rear end of the station for movement in a direction toward and away from the mouth of the station in accordance with the individual transfer of cards between the station and the transport means and for the urging of the cards in a direction to maintain the cards in stacked relationship and to obtain a transfer of the cards between the station and the transport means, and flexible means operatively coupled to the last mentioned means at one lateral end of such last mentioned means and extending along the full lateral dimension of such last mentioned means and along substantially the full dimension of the mouth of the station in a direction transverse to the direction of movement of the cards toward and away from the mouth of the station and moveable with such last mentioned means and responsive to the number of cards in the station for inclining the cards in the station at an angle dependent upon the number of cards in the station to facilitate the transfer of cards between the station and the transport means.

References Cited in the file of this patent

UNITED STATES PATENTS

| | | |
|---|---|---|
| 1,146,929 | Droitcour | July 20, 1915 |
| 2,883,188 | Gray et al. | Apr. 21, 1959 |
| 2,938,722 | Luning | May 31, 1960 |